US012737111B2

(12) United States Patent
Mallick et al.

(10) Patent No.: US 12,737,111 B2
(45) Date of Patent: Sep. 15, 2026

(54) LEVERAGING HOST ACCELERATOR RESOURCES TO REDUCE STORAGE SYSTEM COMPUTATIONAL LOAD

(71) Applicant: Dell Products L.P., Round Rock, TX (US)

(72) Inventors: Sanjib Mallick, Bangalore (IN); Vinay G. Rao, Bangalore (IN); Yevgeni Gehtman, Modi'in (IL); Tomer Shachar, Beer-Sheva (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/611,860

(22) Filed: Mar. 21, 2024

(65) Prior Publication Data

US 2025/0298507 A1 Sep. 25, 2025

(51) Int. Cl.
*G06F 3/06* (2006.01)

(52) U.S. Cl.
CPC .......... *G06F 3/0604* (2013.01); *G06F 3/0623* (2013.01); *G06F 3/0635* (2013.01); *G06F 3/0641* (2013.01); *G06F 3/067* (2013.01)

(58) Field of Classification Search
None
See application file for complete search history.

(56) References Cited

U.S. PATENT DOCUMENTS 6,567,397 B1 5/2003 Campana, Jr. et al.
6,687,746 B1 2/2004 Shuster et al.
(Continued)

FOREIGN PATENT DOCUMENTS

CN 103677927 B 2/2017
EP 1117028 A2 7/2001
(Continued)

OTHER PUBLICATIONS

Al-Kiswany et al., GPUs as Storage System Accelerators, IEEE Transactions on Parallel and Distributed Systems (vol. 24, Issue: 8, pp. 1556-1566). (Year: 2012).*
(Continued)

*Primary Examiner* — Arpan P. Savla
*Assistant Examiner* — Edmund H Kwong
(74) *Attorney, Agent, or Firm* — Ryan, Mason & Lewis, LLP

(57) ABSTRACT

An apparatus illustratively comprises at least one processing device that includes a processor and a memory, with the processing device being configured to obtain in a host device deduplication information relating to a logical storage device of a storage system, wherein the host device comprises acceleration resources and is configured to communicate with the storage system over at least one network, and to determine based at least in part on the obtained deduplication information whether to compute a content-based signature for one or more data blocks of the logical storage device utilizing the acceleration resources of the host device. Responsive to an affirmative result of the determining, the content-based signature is computed utilizing the acceleration resources of the host device and sent by the host device to the storage system in association with a given write operation that targets the one or more data blocks of the logical storage device.

20 Claims, 5 Drawing Sheets

(56) References Cited

U.S. PATENT DOCUMENTS 6,697,875 B1 2/2004 Wilson
7,275,103 B1 9/2007 Thrasher et al.
7,454,437 B1 11/2008 Lavallee et al.
7,617,292 B2 11/2009 Moore et al.
7,668,981 B1 2/2010 Nagineni et al.
7,770,053 B1 8/2010 Bappe et al.
7,809,912 B1 10/2010 Raizen et al.
7,818,428 B1 10/2010 Lavallee et al.
7,890,664 B1 2/2011 Tao et al.
7,904,681 B1 3/2011 Bappe et al.
7,925,872 B2 4/2011 Lai et al.
8,250,256 B2 8/2012 Ghosalkar et al.
8,285,825 B1 10/2012 Nagaraj et al.
8,825,919 B1 9/2014 Lim et al.
8,832,334 B2 9/2014 Okita
8,874,746 B1 10/2014 Gonzalez
9,026,694 B1 5/2015 Davidson et al.
9,201,803 B1 12/2015 Derbeko et al.
9,400,611 B1 7/2016 Raizen
9,430,368 B1 8/2016 Derbeko et al.
9,594,780 B1 3/2017 Esposito et al.
9,647,933 B1 5/2017 Tawri et al.
9,672,160 B1 6/2017 Derbeko et al.
9,778,852 B1 10/2017 Marshak et al.
10,289,325 B1 5/2019 Bono
10,353,714 B1 7/2019 Gokam et al.
10,439,878 B1 10/2019 Tah et al.
10,474,367 B1 11/2019 Mallick et al.
10,476,960 B1 11/2019 Rao et al.
10,521,369 B1 12/2019 Mallick et al.
10,606,496 B1 3/2020 Mallick et al.
10,637,917 B2 4/2020 Mallick et al.
10,652,206 B1 5/2020 Pusalkar et al.
10,678,778 B1 * 6/2020 Chalmer ............. G06F 16/9535
10,754,572 B2 8/2020 Kumar et al.
10,757,189 B2 8/2020 Mallick et al.
10,764,371 B2 9/2020 Rao et al.
10,789,006 B1 9/2020 Gokam et al.
10,817,181 B2 10/2020 Mallick et al.
10,838,648 B2 11/2020 Sharma et al.
10,880,217 B2 12/2020 Mallick et al.
10,884,935 B1 1/2021 Doddaiah
10,911,402 B2 2/2021 Pusalkar et al.
10,936,220 B2 3/2021 Mallick et al.
10,936,335 B2 3/2021 Mallick et al.
10,949,104 B2 3/2021 Marappan et al.
10,996,879 B2 5/2021 Gokam
11,016,699 B2 5/2021 Anchi et al.
11,016,783 B2 5/2021 Rao et al.
11,044,313 B2 6/2021 Patel et al.
11,044,347 B2 6/2021 Kumar et al.
11,050,660 B2 6/2021 Rao et al.
11,093,155 B2 8/2021 Anchi et al.
11,106,381 B2 8/2021 Rao et al.
11,126,358 B2 9/2021 Kumar et al.
11,126,363 B2 9/2021 Tidke et al.
11,157,203 B2 10/2021 Gokam et al.
11,366,771 B2 6/2022 Smith et al.
11,615,340 B2 3/2023 Mallick et al.
2002/0023151 A1 2/2002 Iwatani
2002/0103923 A1 8/2002 Cherian et al.
2004/0010563 A1 1/2004 Forte et al.
2006/0026346 A1 2/2006 Kadoiri et al.
2006/0277383 A1 12/2006 Hayden et al.
2007/0174849 A1 7/2007 Cheung et al.
2008/0043973 A1 2/2008 Lai et al.
2008/0201458 A1 8/2008 Salli
2008/0301332 A1 12/2008 Butler et al.
2009/0259749 A1 10/2009 Barrett et al.
2010/0313063 A1 12/2010 Venkataraja et al.
2011/0197027 A1 8/2011 Balasubramanian et al.
2011/0296230 A1 12/2011 Chen et al.
2012/0102369 A1 4/2012 Hiltunen et al.
2012/0246345 A1 9/2012 Contreras et al.
2013/0117766 A1 5/2013 Bax et al.
2013/0339551 A1 12/2013 Flanagan et al.
2014/0105068 A1 4/2014 Xu
2015/0222705 A1 8/2015 Stephens
2015/0242134 A1 8/2015 Takada et al.
2016/0092136 A1 3/2016 Balakrishnan et al.
2016/0117113 A1 4/2016 Li et al.
2016/0335003 A1 11/2016 Ahmed et al.
2017/0235507 A1 8/2017 Sinha et al.
2018/0189635 A1 7/2018 Olarig et al.
2018/0253256 A1 9/2018 Bharadwaj
2018/0317101 A1 11/2018 Koue
2019/0095299 A1 3/2019 Liu et al.
2019/0108888 A1 4/2019 Sarkar et al.
2019/0334987 A1 10/2019 Mallick et al.
2020/0021653 A1 1/2020 Rao et al.
2020/0097203 A1 3/2020 Mallick et al.
2020/0106698 A1 4/2020 Rao et al.
2020/0110552 A1 4/2020 Kumar et al.
2020/0112608 A1 4/2020 Patel et al.
2020/0192588 A1 6/2020 Kumar et al.
2020/0204475 A1 6/2020 Mallick et al.
2020/0204495 A1 6/2020 Mallick et al.
2020/0213274 A1 7/2020 Pusalkar et al.
2020/0241890 A1 7/2020 Mallick et al.
2020/0314218 A1 10/2020 Kumar et al.
2020/0348860 A1 11/2020 Mallick et al.
2020/0348861 A1 11/2020 Marappan et al.
2020/0348869 A1 11/2020 Gokam
2020/0349094 A1 11/2020 Smith et al.
2020/0363985 A1 11/2020 Gokam et al.
2020/0372401 A1 11/2020 Mallick et al.
2021/0019054 A1 1/2021 Anchi et al.
2021/0026551 A1 1/2021 Tidke et al.
2021/0026650 A1 1/2021 Rao et al.
2021/0157502 A1 5/2021 Rao et al.
2021/0181965 A1 6/2021 Anchi et al.
2022/0121361 A1* 4/2022 Kamran .................. G06F 3/067
2023/0102067 A1* 3/2023 Richardson ........... G06F 3/0629 711/105
2023/0126783 A1* 4/2023 Hu ...................... G06F 12/1018

FOREIGN PATENT DOCUMENTS

EP 2667569 A1 11/2013
WO WO-2024041140 A1 * 2/2024 ......... G06F 13/4282
WO WO-2025110261 A1 * 5/2025 ............. G06N 20/00

OTHER PUBLICATIONS

International Search Report and Written Opinion of PCT/US2019/052549 dated Dec. 4, 2019, 13 pages.
International Search Report and Written Opinion of PCT/US2019/053204 dated Dec. 16, 2019, 40 pages.
International Search Report and Written Opinion of PCT/US2019/053473 dated Dec. 19, 2019, 16 pages.
International Search Report and Written Opinion of PCT/US2019/067144 dated May 4, 2020, 26 pages.
Kris Piepho, “Dell EMC SC Series Storage: Microsoft Multipath I/O,” Dell EMC Best Practices, Jan. 2017, 57 pages.
NVM Express, “NVM Express, Revision 1.3,” NVM Express, May 1, 2017, 282 pages.
VMWare, “Multipathing Configuration for Software iSCSI Using Port Binding,” Technical White Paper, Apr. 25, 2012, 15 pages.
Dell EMC, “Dell EMC SC Series Storage: Microsoft Multipath I/O,” Dell EMC Engineering, Jun. 2017, 56 pages.
Dell EMC, “Dell EMC PowerPath Family: PowerPath and PowerPath/VE Multipathing,” Data Sheet, 2017, 3 pages.
EMC, “EMC PowerPath and PowerPath/VE Family for Windows,” Installation and Administration Guide, Oct. 2018, 102 pages.
EMC, “EMC Powerpath Load Balancing and Failover”, Comparison with native MPIO operating system solutions, Feb. 2011, 28 pages.
Dell EMC, “PowerMax OS,” Dell EMC PowerMax Family Product Guide, May 2019, 192 pages.
Dell EMC, “Dell EMC SC Series Storage and Microsoft Multipath I/O,” CML 1004, Jul. 2018, 36 pages.

(56) References Cited

OTHER PUBLICATIONS

VMWare, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.
Seagate Technology LLC, "SCSI Commands Reference Manual," Fibre Channel (FC) Serial Attached SCSI (SAS), Publication No. 100293068, Rev. J, Oct. 2016, 518 pages.

* cited by examiner

Figure 4:
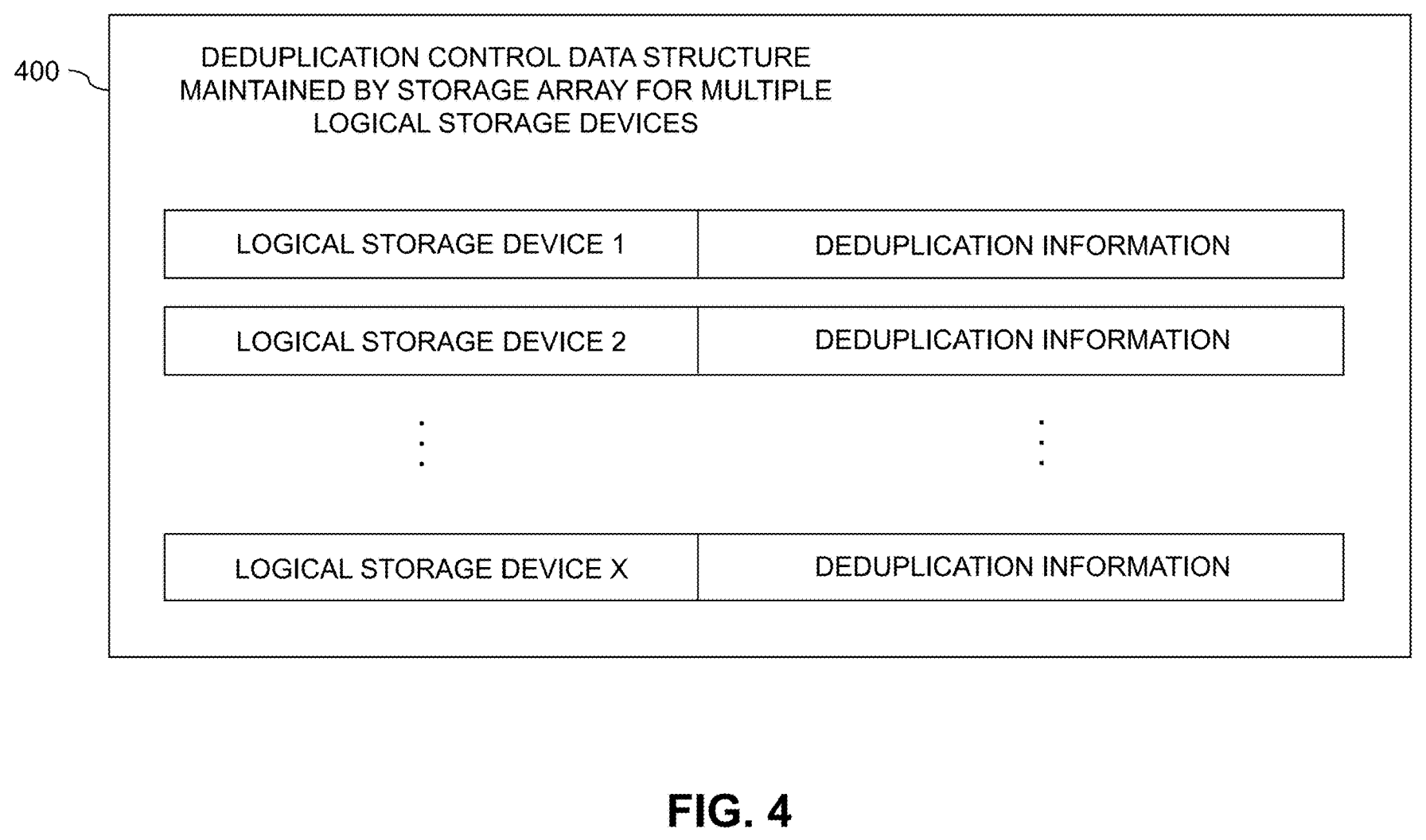

400

DEDUPLICATION CONTROL DATA STRUCTURE MAINTAINED BY STORAGE ARRAY FOR MULTIPLE LOGICAL STORAGE DEVICES

| | |
|---|---|
| LOGICAL STORAGE DEVICE 1 | DEDUPLICATION INFORMATION |
| LOGICAL STORAGE DEVICE 2 | DEDUPLICATION INFORMATION |
| ⋮ | ⋮ |
| LOGICAL STORAGE DEVICE X | DEDUPLICATION INFORMATION |

| Byte \ Bit | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT | | | DPO | FUA | Reserved | Obsolete | Obsolete |
| 2 | (MSB) LOGICAL BLOCK ADDRESS | | | | | | | |
| ... | | | | | | | | |
| 5 | | | | | | | | (LSB) |
| 6 | Reserved | | | 1 (501) | GROUP NUMBER 502 | | | |
| 7 | (MSB) TRANSFER LENGTH | | | | | | | |
| 8 | | | | | | | | (LSB) |
| 9 | CONTROL | | | | | | | |

FIG. 5

LEVERAGING HOST ACCELERATOR RESOURCES TO REDUCE STORAGE SYSTEM COMPUTATIONAL LOAD

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. In these and other arrangements, a storage system with data deduplication functionality may utilize substantial amounts of computational resources in computing hashes or other types of content-based signatures for data written by one or more of the host devices to the storage system. This can adversely impact storage system performance under various conditions.

SUMMARY

Illustrative embodiments disclosed herein provide techniques for leveraging host accelerator resources to reduce storage system computational load. For example, some embodiments disclosed herein provide techniques for leveraging graphics processing units (GPUs), data processing units (DPUs) and/or other types of acceleration resources implemented in or otherwise accessible to one or more host devices in order to reduce computational load in a storage array or other type of storage system. These and other embodiments can significantly reduce the amounts of computational resources consumed by a storage system in computing hashes or other types of content-based signatures for data written by one or more of the host devices to the storage system, thereby improving storage system performance.

In an illustrative embodiment, an apparatus comprises at least one processing device that includes a processor and a memory, with the processor being coupled to the memory. The at least one processing device is configured to obtain in a host device deduplication information relating to a logical storage device of a storage system, wherein the host device comprises acceleration resources and is configured to communicate with the storage system over at least one network. The at least one processing device is further configured to determine based at least in part on the obtained deduplication information whether to compute a content-based signature for one or more data blocks of the logical storage device utilizing the acceleration resources of the host device.

Responsive to an affirmative result of the determining, the content-based signature is computed utilizing the acceleration resources of the host device and sent by the host device to the storage system in association with a given write operation that targets the one or more data blocks of the logical storage device.

Responsive to a negative result of the determining, the content-based signature is not computed utilizing the acceleration resources of the host device and the given write operation is sent by the host device to the storage system without the content-based signature.

The at least one processing device illustratively comprises at least the host device itself, although other arrangements are possible.

As indicated above, the acceleration resources of the host device in some embodiments comprise one or more GPUs implemented within the host device. Additionally or alternatively, other types of acceleration resources can be used, such as, for example, one or more DPUs implemented within the host device.

These and other illustrative embodiments include, without limitation, apparatus, systems, methods and computer program products comprising processor-readable storage media.

BRIEF DESCRIPTION OF THE DRAWINGS

FIG. 4 shows an example data structure utilized in leveraging host acceleration resources to reduce storage system computational load in an illustrative embodiment.

FIG. 5 shows an example write command that includes an indicator specifying that host acceleration resources have been leveraged for computation of a content-based signature in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
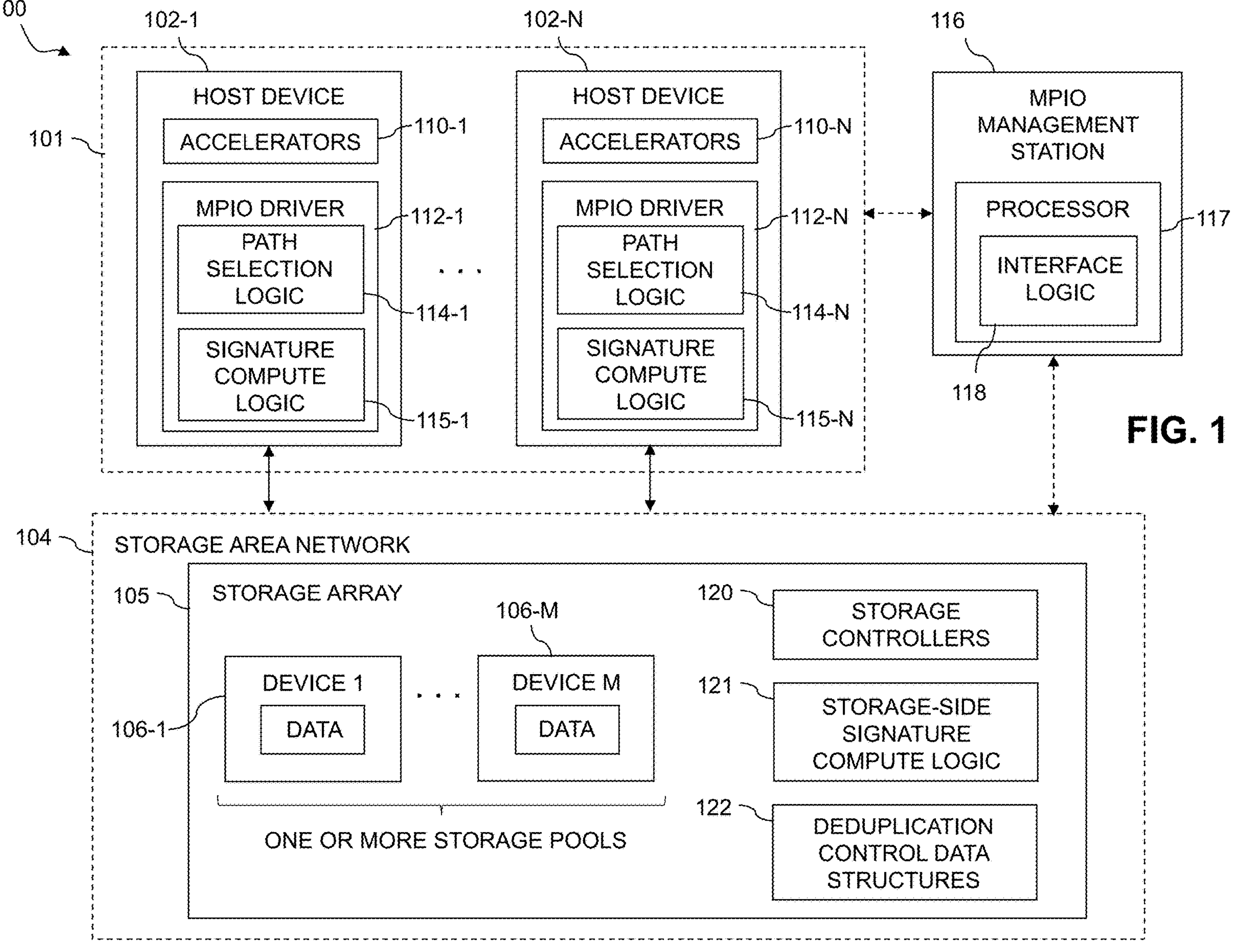
FIG. 1 is a block diagram of an information processing system configured with functionality for leveraging host acceleration resources to reduce storage system computational load in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools, and may be viewed as examples of what are more generally referred to in some embodiments as "back-end storage devices" of a storage array.

The storage array 105 and its associated storage devices 106 are an example of what is more generally referred to herein as a "storage system." This storage system in the present embodiment is illustratively shared by the host devices 102. Other embodiments can include only a single host device, possibly configured to have exclusive use of the storage system.

In some embodiments, the storage array 105 more particularly comprises a distributed storage array that includes multiple storage nodes interconnected with one another, possibly in a mesh network arrangement. Such an arrangement is an example of what is more generally referred to herein as a "distributed storage system."

As will be described in more detail below, illustrative embodiments disclosed herein implement collaborative interaction between the host devices 102 and the storage array 105 to leverage host acceleration resources in a manner that reduces the computational load of the storage array 105. For example, such arrangements can significantly reduce the amounts of computational resources expended by the storage array 105 in computing hashes or other content-based signatures for data being written to the storage array 105 by the host devices 102, thereby improving storage system performance.

The host devices 102 illustratively comprise respective computers, servers or other types of processing devices capable of communicating with the storage array 105 over the SAN 104. For example, at least a subset of the host devices 102 may be implemented as respective processing devices of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective accelerators 110-1, . . . 110-N and respective MPIO drivers 112-1, . . . 112-N. The accelerators 110, which may comprise GPU-based accelerators, DPU-based accelerators and/or other types of acceleration hardware, are examples of what are more generally referred to herein as "acceleration resources" of the respective host devices 102. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further includes functionality for leveraging acceleration resources of the host devices 102, illustratively the accelerators 110, to reduce computational load of the storage array 105. Such functionality is provided at least in part using respective instances of signature compute logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to implement functionality for leveraging host acceleration resources to reduce the computation load of the storage array 105. Other types of MPIO drivers from other driver vendors may be suitably modified to incorporate functionality for leveraging host acceleration resources to reduce storage system computational load as disclosed herein. It is to be appreciated, however, that utilization of MPIO drivers in implementing such functionality is not required in other embodiments, and the disclosed functionality can be implemented at least in part in other components of the host devices 102.

The host devices 102 can include additional or alternative components. For example, in some embodiments, the host devices 102 comprise respective local caches, implemented using respective memories of those host devices. A given such local cache can be implemented using one or more cache cards, or other suitable circuitry arrangements. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices. Similar caching arrangements may be implemented in the storage array 105, utilizing memories implemented in or otherwise associated with the storage controllers 120.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, can be configured to perform at least a portion of the functionality for leveraging host acceleration resources to reduce storage system computational load as disclosed herein. For example, the MPIO management station 116 can be configured to manage various aspects of the operation of the instances of signature compute logic 115 of the respective MPIO drivers 112.

The MPIO driver 112-1 is configured to deliver IO operations selected from one or more sets of IO queues of host device 102-1 to the storage array 105 via selected ones of multiple paths over the SAN 104. The sources of the IO operations stored in a given set of IO queues illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a particular one of the IO queues of the host device 102-1 with other operations generated by other processes of that application, and possibly other processes of other applications.

The paths from the host device 102-1 to the storage array 105 illustratively comprise paths associated with respective initiator-target pairs, with each initiator comprising a single-port or multi-port host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices. The HBAs may be viewed as examples of what are more generally referred to herein as "host ports."

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system in which multiple VMs run on a single ESXi server with HBAs. All VMs are using all HBAs but there is a need to be able to distinguish which IO belongs to which VM, for example, in order to implement different SLOs between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of VMs of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various host-side scheduling algorithms, load balancing algorithms and/or other types of algorithms can be utilized by the MPIO driver 112-1 in delivering IO operations from the IO queues of the host device 102-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective ports of the host device 102-1 and that the targets of the plurality of initiator-target pairs comprise respective ports of the storage array 105. Examples of such host ports and storage array ports are illustrated in conjunction with the embodiment of FIG. 3.

Selecting a particular one of multiple available paths for delivery of a selected one of the IO operations of a set of IO queues of the host device 102-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path. Such host registration operations are illustratively part of a host registration process.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (ISCSI), SCSI over FC (SCSI-FC), NVMe over FC (NVMe/FC), NVMe over Fabrics (NVMe-oF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to communicate with the storage array 105 to facilitate leveraging of host acceleration resources to reduce computational load of the storage array 105 as disclosed herein.

In the FIG. 1 embodiment, the storage array 105 comprises a plurality of storage controllers 120, storage-side signature compute logic 121, and one or more deduplication control data structures 122 for storing deduplication statistics for respective logical storage volumes or other logical storage devices in the storage array 105. In other embodiments, at least portions of one or more of the storage-side signature compute logic 121 and the deduplication control data structures 122 can be implemented at least in part external to the storage array 105 rather than internal to the storage array 105. For example, in some embodiments at least portions of the storage-side signature compute logic 121 and deduplication control data structures 122 are implemented on one or more servers that are external to the storage array 105.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log select, mode select, log sense and/or mode sense commands), vendor unique commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches or other internal memories, may also be provided in the storage array 105 for use in processing IO operations. For example, in some embodiments, each of the storage controllers 120 has a different local cache or a different allocated portion of a global cache associated therewith, although numerous alternative arrangements are possible. Such local caches or different allocated portions of a global cache are examples of what are referred to herein as respective "memories" of the storage controllers 120. In some embodiments, such memories may be collectively referred to as "read memory" of the storage array 105.

Other types of memories may be associated with the respective storage controllers 120 in other embodiments, and such memories may be internal to the storage controllers 120, external to the storage controllers 120, or partially internal and partially external to the storage controllers 120. Such memories in some embodiments are coupled together via a high-speed network, such as an InfiniBand backbone network or other arrangement of interconnects configured to facilitate rapid transfer of data between the memories. The storage controllers 120 can be implemented as respective storage processors, directors or other storage system components configured to control storage system operations relating to processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVM Express Base Specification, Revision 2.0c, October 2022, and its associated NVM Express Command Set Specification and NVM Express TCP Transport Specification, all of which are incorporated by reference herein. Other examples of NVMe storage access protocols that may be utilized in illustrative embodiments disclosed herein include NVMe over Fibre Channel, also referred to herein as NVMe/FC, NVMe over Fabrics, also referred to herein as NVMe-oF, and NVMe over TCP, also referred to herein as NVMe/TCP. Other embodiments can utilize other types of storage access protocols, such as the iSCSI protocol.

The storage array 105 in the present embodiment is assumed to comprise one or more internal memories that are implemented using a flash memory or other type of non-volatile memory of the storage array 105. More particular examples include NAND-based flash memory or other types of non-volatile memory such as resistive RAM, phase change memory, and spin torque transfer magneto-resistive RAM (STT-MRAM). The internal memories are further assumed to be separate from the storage devices 106 of the storage array 105 in some embodiments. However, the storage devices 106 may comprise flash-based storage devices, as in embodiments involving all-flash storage arrays, or may be implemented in whole or in part using other types of non-volatile memory.

In some embodiments, the storage devices 106 more particularly comprise respective back-end storage devices of the storage array 105, as distinguished from memories of the storage array 105, such as memories comprising respective caches of the storage controllers 120. Terms such as "back-end storage device" and "memory" as used herein are intended to be broadly construed, so as to encompass these and other arrangements.

The storage array 105 in the present embodiment may comprise additional components not explicitly shown in the figure, such as a response time control module and IO operation priority queues, illustratively configured to make use of corresponding portions of the above-described internal memories. For example, the response time control module may be used to implement storage array based adjustments in response time for particular IO operations based at least in part on service level objective (SLO) information stored by the storage array 105 in a given one of its internal memories. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105.

As another illustration, in some embodiments, the IO operation priority queues are implemented as respective SLO-based queues. For example, the SLO-based queues illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues. The SLO-based queues are illustratively associated with respective SLOs for processing of IO operations in the storage array 105.

In these and other embodiments, process tags may be used in assigning different ones of the IO operations to different ones of the SLO-based queues or other IO operation priority queues of the storage array 105. However, use of process tags is not required, and other techniques can be used to assign particular IO operations received in the storage array 105 to particular ones of the IO operation priority queues.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a distributed storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active arrangements, Asymmetric Logical Unit Access and/or Asymmetric Namespace Access (ALUA/ANA) arrangements, etc.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, accelerators 110, and MPIO drivers 112, including their corresponding instances of path selection logic 114 and signature compute logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated previously, under conventional practice, a storage system with data deduplication functionality may utilize substantial amounts of computational resources in computing hashes or other types of content-based signatures for data written by one or more of the host devices to the storage system. This can adversely impact storage system performance under various conditions.

Illustrative embodiments overcome these and other drawbacks of conventional practice by providing techniques for leveraging host accelerator resources to reduce storage system computational load. For example, some embodiments disclosed herein provide techniques for leveraging GPUs, DPUs and/or other types of acceleration hardware implemented in or otherwise accessible to one or more of the host devices 102 in order to reduce computational load in the storage array 105. These and other embodiments can significantly reduce the amounts of computational resources consumed by the storage array 105 in computing hashes or other types of content-based signatures for data written by one or more of the host devices 102 to the storage array 105, thereby improving storage system performance.

Accordingly, illustrative embodiments overcome various drawbacks of conventional practice by configuring the system 100 to include functionality for leveraging host acceleration resources to reduce storage system computational load of the storage array 105, through collaboration between storage array 105 and the host devices 102, as will now be described in more detail.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105.

The MPIO driver 112-1 in this embodiment is further configured via its signature compute logic 115-1 to obtain in the host device 102-1 deduplication information relating to a logical storage device of the storage array 105.

As indicated above, the host device 102-1 comprises acceleration resources, illustratively implemented as accelerators 110-1, which may comprise GPU-based accelerators that each include one or more sets of GPUs. Other types of acceleration resources comprising other types of acceleration hardware can be used in other embodiments, such as, for example, one or more sets of DPUs. Acceleration resources such as GPUs and DPUs are generally separate from central processing unit (CPU) resources of the host device 102-1, and in some embodiments are dedicated to performing particular types of computations, such as computing content-based signatures for use in a deduplication process implemented by the storage array 105. In some embodiments, the GPUs and/or DPUs of the accelerators 110-1 may be deployed on one or more circuit cards that are inserted into respective PCIe slots of the host device 102-1. As another example, the host acceleration resources may be deployed on one or more separate servers or other devices that are coupled to or otherwise accessible to the host device 102-1. The term "acceleration resources" as used herein is intended to be broadly construed so as to encompass these and numerous other arrangements.

The MPIO driver 112-1 via its signature compute logic 115-1 utilizes at least portions of the obtained deduplication information to determine whether to compute a content-based signature for one or more data blocks of the logical storage device utilizing the acceleration resources of the host device 102-1.

Responsive to an affirmative result of the determining, the content-based signature is computed utilizing the acceleration resources of the host device 102-1 and sent by the host device 102-1 to the storage array 105 in association with a given write operation that targets the one or more data blocks of the logical storage device.

Responsive to a negative result of the determining, the content-based signature is not computed utilizing the acceleration resources of the host device 102-1 and the given write operation is sent by the host device 102-1 to the storage array 105 without the content-based signature.

In some embodiments, the content-based signature is computed for the one or more data blocks of the logical storage device by applying a secure hashing algorithm (SHA) to the one or more data blocks. For example, secure hashing algorithms such as SHA-256 and SHA-512 can be used to compute the content-based signature. Other types of collision-resistant hash functions can be used in other embodiments. The term "content-based signature" as used herein is intended to be broadly construed, so as to encompass, for example, hash digests, deduplication signatures and/or other types of signatures that are generated based at least in part on content of one or more data blocks.

In some embodiments, the MPIO driver 112-1 sends a designated command from the host device 102-1 to the storage array 105 to obtain in response thereto from the storage array 105 an indication as to whether or not the storage array 105 supports leveraging of the acceleration resources of the host device 102-1 to compute the content-based signature. The MPIO driver 112-1 then initiates the above-noted determining of whether or not to utilize the acceleration resources based at least in part on the obtained indication. For example, if the obtained indication indicates that the storage array 105 does not support leveraging of the acceleration resources of the host device 102-1 to compute the content-based signature, the above-noted determining need not be initiated at all.

Additionally or alternatively, the MPIO driver 112-1 in some embodiments sends a designated command from the host device 102-1 to the storage array 105 to obtain in response thereto from the storage array 105 an indication as to a particular deduplication process utilized by the storage array 105 for the logical storage device. The MPIO driver 112-1 then initiates the above-noted determining of whether or not to utilize the acceleration resources based at least in part on the obtained indication. For example, if the obtained indication indicates that the storage array 105 uses a deduplication process that requires content-based signatures that cannot be computed by the acceleration resources of the host device 102-1, the determining need not be initiated at all.

Accordingly, in some embodiments, the MPIO driver 112-1 via its signature compute logic 115-1 first determines using one or more of the above-noted designated commands that the storage array 105 supports the leveraging of host acceleration resources to compute content-based signatures and also utilizes a deduplication process that is consistent with the content-based signatures that can be generated by the acceleration resources, before initiating the above-noted determining of whether or not to utilize the acceleration resources of the host device 102-1 to compute content-based signatures. These designated commands and other commands referred to herein may comprise, for example, SCSI commands, NVMe commands and/or commands in another storage access protocol. As more particular examples, such commands can comprise log sense, mode sense and/or vendor unique commands, although any of a wide variety of other types of commands can be used in other embodiments. Such commands will generally vary in terms of format and content depending upon the particular storage access protocol utilized by the host devices 102 to communicate with the storage array 105, such as a SCSI access protocol or an NVMe access protocol.

In some embodiments, the deduplication information obtained by the MPIO driver comprises at least a deduplication rate for at least a portion of the logical storage device. Such a deduplication rate is illustratively indicative of a percentage, ratio or other specified part of the data content of the logical storage device that is likely to and/or has previously been found to have duplicate content present in the storage array 105, possibly in other logical storage volumes of the storage array 105. The term "deduplication rate" as used herein is intended to be broadly construed so as to encompass, for example, the above-noted arrangements as well as various other types of information that indicate the degree to which content of the logical storage volume is expected to be deduplicated within the storage array 105. A wide variety of other deduplication information can be used in other embodiments, and the term "deduplication information" as used herein is therefore also intended to be broadly construed. Such deduplication information in some embodiments comprises deduplication statistics that are stored in association with an identifier of a corresponding logical storage volume or other type of logical storage device in at least one of the deduplication control data structures 122 of the storage array 105. An example of such a data structure is shown in FIG. 4, but numerous other types and arrangements of one or more data structures can be used.

In some embodiments, determining based at least in part on the obtained deduplication information whether to compute the content-based signature for the one or more data blocks of the logical storage device utilizing the acceleration resources of the host device 102-1 illustratively comprises comparing the deduplication rate to a threshold.

Responsive to the deduplication rate being at or above the threshold, the above-noted affirmative result of the determining is reached, that is, the acceleration resources of the host device 102-1 will be used to compute the content-based signature to reduce the computational load of the storage array 105.

Responsive to the deduplication rate being below the threshold, the above-noted negative result of the determining is reached, that is, the acceleration resources of the host device 102-1 will not be used to compute the content-based signature to reduce the computational load of the storage array 105, and instead the content-based signature will be computed by the storage array 105.

In some embodiments, the deduplication information relating to the logical storage volume is obtained in the host device 102-1 by the MPIO driver 112-1 sending a designated command from the host device 102-1 to the storage array 105 to obtain the deduplication information from the storage array 105 in response to the designated command. Again, such a command can be, for example, a SCSI command, an NVMe command, or another of a type that can be used by the host device 102-1 to obtain information from the storage array 105.

The content-based signature computed using the acceleration resources of the host device 102-1 is illustratively sent by the MPIO driver 112-1 from the host device 102-1 to the storage array 105 in a header of the given write operation. A payload of the given write operation illustratively comprises the one or more data blocks from which the content-based signature in the header was computed utilizing the acceleration resources of the host device 102-1. The header of the given write operation in some embodiments further includes an indication as to whether or not acceleration resources of the host device 102-1 have been utilized to compute the content-based signature. An example of such an indication will be described below in conjunction with the example write command of FIG. 5.

It should be noted that the MPIO driver 112-1 can send multiple content-based signatures with a given write command, each such signature being computed using a different set of one or more data blocks targeted by the given write operation. For example, a header of the given write operation may include a plurality of content-based signatures computed utilizing the acceleration resources of the host device 102-1 for respective different sets of one or more data blocks of the logical storage device that are targeted by the given write operation. Numerous other arrangements are possible.

The storage array 105 utilizes a given content-based signature received from the host device 102-1 as part of a deduplication process for the logical storage volume. For example, the storage array 105 is illustratively configured to determine whether or not the content-based signature received from the host device 102-1 in association with the given write operation is recognized by the storage array 105 as corresponding to an existing content-based signature already present in the storage array 105. Responsive to the content-based signature being recognized by the storage array 105, the storage array 105 utilizes the content-based signature in its deduplication process but does not need to obtain the one or more data blocks from the given write operation, as its recognition of the content-based signature means that the corresponding data is already present in the storage array 105. Responsive to the content-based signature not being recognized by the storage array 105, the storage array 105 obtains the one or more data blocks from the given write operation and stores the one or more data blocks in association with the content-based signature.

These and other functions in the storage array 105 are illustratively performed by the storage controllers 120 and the storage-side signature compute logic 121. As indicated previously, the storage controllers 120 can be implemented as respective storage processors, directors or other storage system components configured to control storage system operations relating to processing of IO operations. The term "storage controller" as used herein is therefore intended to be broadly construed. A given storage controller may comprise multiple storage ports or other targets, each associated with a different path over with the MPIO driver 112-1 can communicate with that target. The storage controller itself, or a portion thereof, may be considered a "target" of a given path in some embodiments.

The above-described host acceleration resource leveraging functionality is illustratively carried out at least in part by cooperative interaction of the host device 102-1 and the storage array 105 utilizing their respective instances of signature compute logic 115-1 and 121.

The other host devices 102 are assumed to operate in a manner similar to that described above for host device 102-1 via their respective instances of MPIO drivers 112 and corresponding path selection logic 114 and signature compute logic 115.

A given one of the host devices 102 and the storage array 105 each may be considered a separate example of what is more generally referred to herein as "at least one processing device" comprising a processor and a memory, with the processor being coupled to the memory. References herein to "at least one processing device" can additionally or alternatively include portions of at least one of the host devices 102 as well as portions of the storage array 105. Other types and arrangements of one or more processing devices can be used to implement host acceleration resource leveraging functionality as disclosed herein.

For example, the storage array 105 can illustratively include multiple sets of one or more processing devices, with each such set corresponding to a different distributed storage node. Each such additional processing device also includes a processor and a memory coupled to the processor, with the additional processing devices being implemented in the respective distributed storage nodes of the storage array 105 and configured to perform at least a portion of the host acceleration resource leveraging functionality for multiple controllers as disclosed herein.

These and other illustrative embodiments disclosed herein include functionality for leveraging host acceleration resources to reduce storage system computational load, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used to interact with a storage array 105 in implementing the disclosed functionality for leveraging host acceleration resources.

An example of an algorithm performed by one or more of the host devices 102 and the storage array 105 in leveraging host acceleration resources to reduce the computational load of the storage array 105 will now be described in more detail. In this example, the content-based signature is more particularly referred to as a deduplication signature, which is utilized in conjunction with a deduplication process implemented by the storage array 105, although other types of content-based signatures can be used in other embodiments.

As indicated previously, a host device sends read and write commands to a storage array or other storage system, illustratively via an MPIO driver of the host device. If the storage array supports deduplication, the storage array applies a deduplication process to the data received with the write command, to determine whether the received data was already seen by the storage array (e.g., the storage array already has a deduplication signature corresponding to the received data). If the storage array already has this deduplication signature, then the storage array will illustratively register the signature in the written range, rather than saving the data. The savings associated with deduplication are gained because the storage array saves to its back-end storage only the relatively short deduplication signature instead of saving the actual data associated with this signature.

However, calculating a deduplication signature for incoming data consumes considerable processing resources in the storage array. Under typical conventional practice, the storage array must calculate the deduplication signature for all incoming write commands. These write commands can arrive from 100s or 1000s of servers or other host devices attached to the storage array. When receiving a read command, if the data was stored in a deduplicated form (e.g., using the signature rather than storing the data itself) then the array must "reinflate" or "hydrate" the data (e.g., translate from the saved deduplication signature to the actual full data) and send the full data back to the host. This conventional approach can be problematic in many typical storage system arrangements.

As mentioned previously, illustrative embodiments disclosed herein overcome these and other drawbacks of conventional practice by providing techniques for leveraging host acceleration resources to reduce storage system computational load.

In some embodiments, host GPUs, DPUs and/or other host-side acceleration resources are leveraged to offload from the storage array some of the computations associated with processing a write command (e.g., calculating the deduplication signature).

As the GPUs, DPUs and/or other acceleration resources are illustratively implemented on one or more host-side servers or other host devices as hardware dedicated to such processing, the offloading will not consume CPU resources of the host devices.

Usually, server hardware, such as that used to implement one or more host devices in illustrative embodiments herein, is substantially less expensive than the total cost of a storage array. Also, server hardware is typically renewed more frequently in user installations than storage array hardware since a storage array upgrade may require moving large amounts of data, possibly with significant downtime. When updating server hardware, all the users must do is shift work to other server nodes, as in a typical clustered or virtualized environment. Also, it is relatively easy to add dedicated processing hardware such as GPUs and/or DPUs to servers, where it may be very difficult to do so in the context of the closed environment of a storage array. Accordingly, illustrative embodiments herein involve adding GPUs, DPUs and/or other dedicated processing hardware to one or more host-side servers or other host devices, for use in offloading signature-related computations from the storage array.

An illustrative embodiment includes an algorithm with the following steps, illustratively carried out through collaborative interaction between signature compute logic instances of host devices 102-1 and storage array 105, although additional or alternative steps can be used in other embodiments, and the ordering of the steps can be varied. For example, although shown in serial order, at least some of the steps can be performed at least in part in parallel with other ones of the steps. In the present example, the host device is assumed to comprise an MPIO layer having at least one MPIO driver. The algorithm steps are illustratively performed by such an MPIO driver interacting with a storage array, as follows:

1. The MPIO driver sends a designated command (e.g., a SCSI/NVMe command) to determine whether the storage array supports the functionality for leveraging of host acceleration resources as disclosed herein. If it does, the host acceleration resource leveraging functionality can be used. If not, conventional write functionality is used instead of the host acceleration resource leveraging functionality.

2. The MPIO driver sends a designated command (e.g., a SCSI/NVMe command) to determine which deduplication process (e.g., deduplication process name/version) is being used by the storage array. If the GPUs, DPUs and/or other acceleration resources installed in the host device support the particular deduplication process being used by the storage array, the host acceleration resource leveraging functionality can be used. If not, conventional write functionality is used instead of the host acceleration resource leveraging functionality.

3. The storage array stores statistics such as the deduplication rate and/or other deduplication information for each of a plurality of logical storage devices, each illustratively corresponding to a separate LUN or other logical storage volume. The host acceleration resource leveraging functionality disclosed herein will generally provide the greatest benefit for those logical storage devices that have relatively high deduplication rates (e.g., deduplication may not be applied to a logical storage device that primarily includes distinct JPEG images as the deduplication rate for such data is low).

4. The MPIO driver sends a designated command (e.g., a SCSI/NVMe command) to determine the deduplication rate for each logical storage device to which IO operations will be targeted, and applies the host acceleration resource leveraging functionality only to those of the logical storage devices that have a sufficiently high deduplication rate (e.g., a deduplication rate above a designated threshold).

5. When a given write command is to be sent from the MPIO driver of the host device to the storage array:

(a) The MPIO driver sends the write payload to the GPUs, DPUs and/or other acceleration resources of the corresponding host device for calculation of the deduplication signature(s) for the data. This is illustratively done on a per-chunk basis for respective chunks of data (e.g., 8K chunks). A signature will be calculated by the GPUs, DPUs and/or other host acceleration resources per chunk and returned to the MPIO driver. Such chunks are only an example of what are more generally referred to herein as "data blocks," and other types and arrangements of blocks of data can be used in other embodiments.

(b) The MPIO driver sends the resulting signature(s) to the storage array as part of the write command. In some embodiments, the command itself includes one or more bits (e.g., a bit in the Group Number ("Group_Num") field of a SCSI command) that are set to signal to the storage array that this write command is a write command in a distinct format used in conjunction with the host acceleration resource leveraging functionality disclosed herein. This distinct format illustratively includes a header of the type disclosed herein, followed by the actual write data. In some embodiments, the header (e.g., the first few blocks of the write command, where the particular number can vary depending on the implementation) contains signature-related information such as the number of signatures (e.g., one signature per chunk), the signatures themselves, and other management data (e.g., full data size, overall checksum, etc.) Following the header is the write payload.

6. The storage array checks if it recognizes the received deduplication signature(s), or in other words, already once "saw" the data (e.g., knows the data associated with the signature(s)). The storage array illustratively implements a background deduplication process that deduplicates existing non-deduplicated data on the array. This illustratively includes data written to the storage array by one or more hosts that do not support deduplication.

(a) If the storage array recognizes the deduplication signature(s) then the storage array saves the signature (s) in place of the data for that block range (e.g., a storage array supporting deduplication registers data that was already seen) and ignores the appropriate chunk in the write payload.

(b) If the storage array doesn't recognize any of the sent signature(s), it will take the data from the write payload and use it (e.g., save the data itself in a hash table with its signature and save the signature to back-end storage).

7. When a given read command is received by the storage array from the MPIO driver of the host device:

(a) If the targeted logical storage device is not deduplicated, the storage array reads the data from the back-end storage device(s) and sends it to the host device.

(b) If the data is deduplicated, the storage array gets the signature(s) associated with the read range, reinflates them, and sends the data back to the host device. The operation of reinflating a deduplication signature is computationally inexpensive, and therefore does not unduly burden the storage array. For example, the storage array illustratively has a hash table with the signature pointing to the actual data.

Although this example algorithm in some embodiments increases the write command size by a limited amount required to accommodate the computed signature(s) sent by the host device, it will save the storage array from the computational burden of calculating the signature(s) by offloading the work to one or more GPUs, DPUs and/or other acceleration resources of the host device.

As indicated above, the host acceleration resource leveraging functionality will generally not be beneficial if the deduplication rate on a particular logical storage device is too low (e.g., below a designated deduplication rate threshold). The MPIO driver will therefore avoid performing the host acceleration resource leveraging functionality for a given logical storage device if the storage array deduplication statistics indicate that the given logical storage device's data doesn't deduplicate well.

It is to be appreciated that the particular algorithm steps above are examples only. Steps shown as being performed in a particular order can instead be performed in a different order and/or at least in part concurrently with one another. Also, as indicated previously, additional or alternative steps can be used in other embodiments.

This example algorithm provides significantly improved performance by leveraging host acceleration resources to reduce storage system computational load. These and other embodiments disclosed herein advantageously leverage host acceleration resources for storage array performance enhancements.

The portions of the example techniques described above that are performed by a given MPIO driver on a corresponding host device can be similarly performed by other MPIO drivers on respective other host devices. Such MPIO drivers illustratively form a multi-path layer comprising multi-pathing software of the host devices. Other types of host drivers can be used in other embodiments.

Multiple such algorithms can be implemented in parallel with one another for leveraging host acceleration resources to reduce storage system computational load for different host devices and/or different storage systems.

Also, although the example algorithm described above illustratively utilizes MPIO drivers of respective host devices, other embodiments can be implemented outside of any multi-pathing software of the host devices. For example, other host device components can be used to implement corresponding portions of the disclosed functionality.

It should also be noted that the example algorithm described above is not limited to use with particular command formats. For example, write commands of an otherwise standard storage access protocol, such as the above-noted SCSI and NVMe access protocols, can be utilized with suitable modification as disclosed herein.

It is to be appreciated that the particular algorithm steps described above and elsewhere herein are presented by way of illustrative example only, and additional or alternative steps can be used in other embodiments. Also, the order of the steps can be varied, and/or at least some of the steps can be performed at least in part in parallel with one another. Other arrangements for leveraging host acceleration resources to reduced storage system computational load can be used in other embodiments.

Additional examples of illustrative embodiments configured to leverage host acceleration resources to reduce storage system computational load will now be described with reference to FIGS. 2 through 4.

Figure 2:
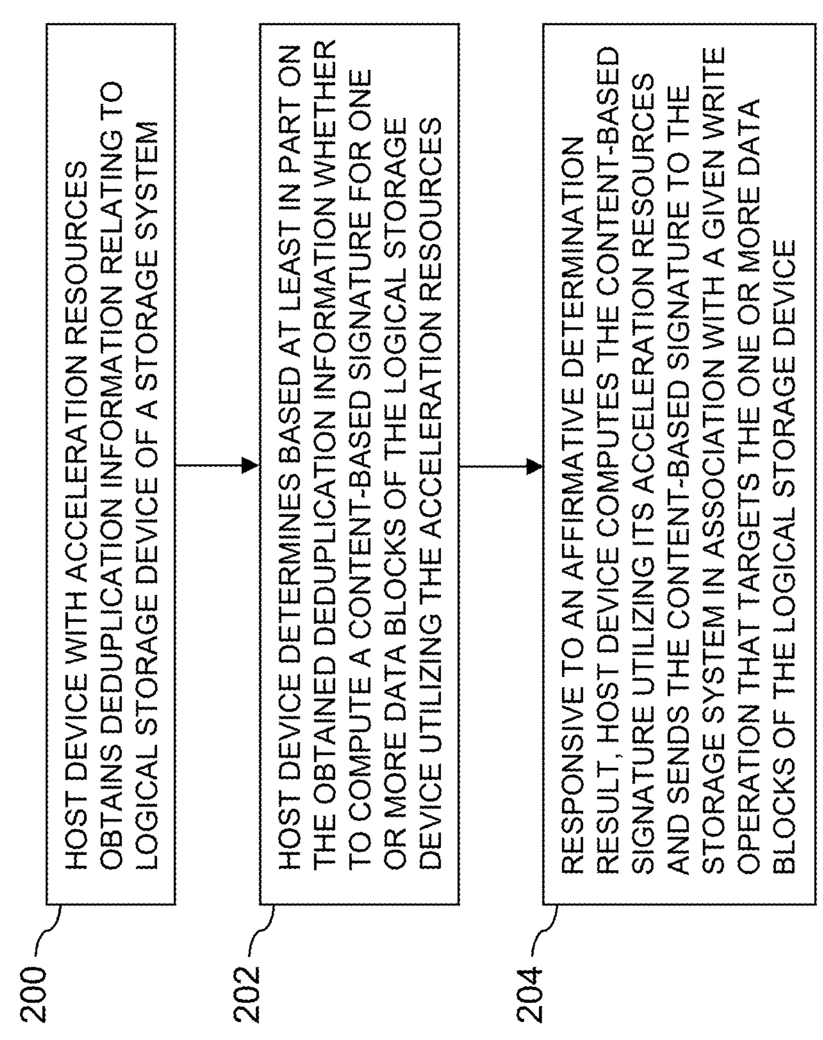
FIG. 2 is a flow diagram of an example process for leveraging host acceleration resources to reduce storage system computational load in an illustrative embodiment.

Referring initially to FIG. 2, an example process for leveraging host acceleration resources to reduce storage system computational load is illustrated. The process as shown includes steps 200 through 204, and is suitable for use in the system 100 but is more generally applicable to other types of systems comprising at least one host device and a storage system. The storage system in this embodiment is assumed to comprise at least one storage array having a plurality of storage devices and one or more storage controllers. The FIG. 2 process is illustratively performed primarily in a host device comprising an MPIO driver with path selection logic and associated signature compute logic, through cooperative interaction or other collaboration with at least one storage array or other storage system. Other embodiments can involve other system components, such as an external server comprising an MPIO management station.

In step 200, a host device with acceleration resources obtains deduplication information relating to logical storage device of a storage system. For example, the deduplication information can comprise at least a deduplication rate and/or other deduplication statistics maintained by the storage system for the logical storage device. Such deduplication information can be obtained, for example, by the host device sending a designated command (e.g., a SCSI or NVMe command) to the storage system, with the deduplication information being obtained in the host device in response to the given command.

In step 202, the host device determines based at least in part on the obtained deduplication information whether to compute a content-based signature for one or more data blocks of the logical storage device utilizing the acceleration resources. For example, if the obtained deduplication information comprises a deduplication rate maintained by the storage system for the logical storage device, the deduplication rate is illustratively compared to a threshold deduplication rate, with an affirmative determination result if the deduplication rate is at or above the threshold deduplication rate, and a negative determination result if the deduplication rate is below the threshold deduplication rate.

In step 204, responsive to an affirmative determination result, the host device computes the content-based signature utilizing its acceleration resources and sends the content-based signature to the storage system in association with a given write operation that targets the one or more data blocks of the logical storage device. This advantageously reduces the computational load on the storage system, by relieving it from the burden of computing the content-based signature for the one or more data blocks.

Alternatively, responsive to a negative determination result, the host device does not compute the content-based signature, and instead sends the given write operation to the storage system without a computed content-based signature.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for leveraging host acceleration resources to reduce storage system computational load. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for different host devices and/or different storage systems.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
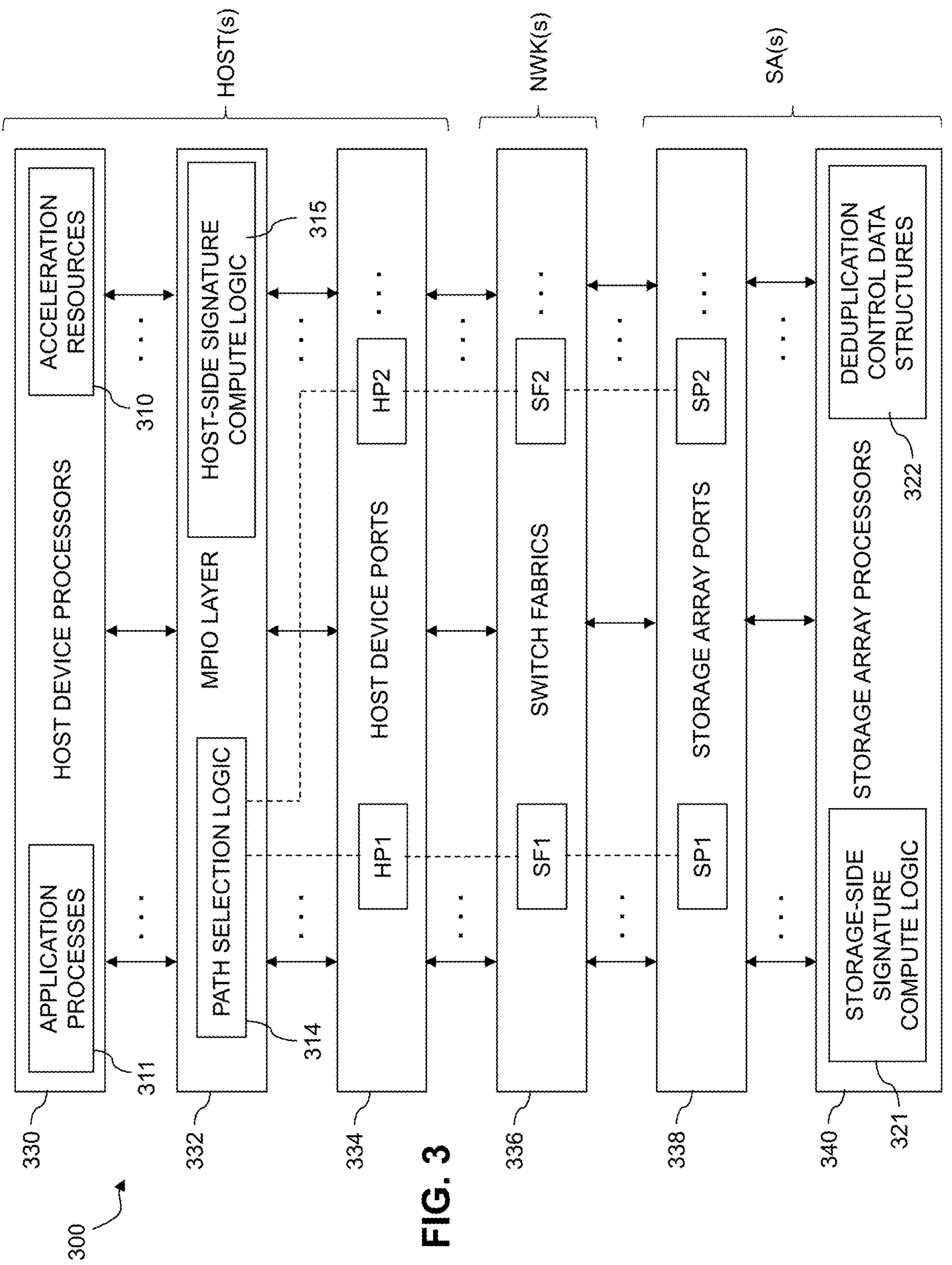
FIG. 3 is a block diagram showing multiple layers of a layered system architecture that incorporates functionality for leveraging host acceleration resources to reduce storage system computational load in an illustrative embodiment.

Referring now to FIG. 3, another illustrative embodiment is shown. In this embodiment, an information processing system 300 comprises host-side elements that include acceleration resources 310, application processes 311, path selection logic 314 and signature compute logic 315. There are illustratively separate instances of one or more such host-side elements associated with each of a plurality of host devices of the system 300.

The system 300 further comprises storage-side elements including signature compute logic 321 and deduplication control data structures 322 that are utilized, in cooperation with instances of signature compute logic 315 of one or more host devices, in leveraging host acceleration resources to reduce computational load in at least one storage array. There may be separate instances of one or more such storage-side elements associated with each of a plurality of storage arrays of the system 300.

The system 300 is configured in accordance with a layered system architecture that illustratively includes a host device processor layer 330, an MPIO layer 332, a host device port layer 334, a switch fabric layer 336, a storage array port layer 338 and a storage array processor layer 340. The host device processor layer 330, the MPIO layer 332 and the host device port layer 334 are associated with one or more host devices, the switch fabric layer 336 is associated with one or more SANs or other types of networks, and the storage array port layer 338 and storage array processor layer 340 are associated with one or more storage arrays ("SAs").

The host device processors of the host device processor layer 330 can comprise, for example, respective VMs and/or processor virtualization containers (e.g., Docker containers), or additional or alternative processing entities that generate IO operations for delivery to one or more storage arrays.

The storage array processors of the storage array processor layer 340 may be viewed as corresponding to one or more storage controllers such as the storage controllers 120 of the storage array 105.

The host device processors of the host device processor layer 330 illustratively further comprise the acceleration resources 310 that are leveraged as disclosed herein to reduce computational load on one or more storage arrays.

The acceleration resources 310 of the host device processor layer 330 may be viewed as corresponding to one or more of the accelerators 110 of the respective host devices 102. As previously indicated, such acceleration resources may comprise GPUs, DPUs and/or other acceleration hardware implemented within or otherwise accessible to the host devices.

The application processes 311 of the host device processor layer 330 generate IO operations that are processed by the MPIO layer 332 for delivery to the one or more storage arrays over the SAN comprising switch fabrics of switch fabric layer 336. Paths are determined by the path selection logic 314 for sending such IO operations to the one or more storage arrays. Indications may be provided by the signature compute logic 315 to the one or more storage arrays, as indicated above.

The MPIO layer 332 is an example of what is also referred to herein as a multi-path layer, and comprises one or more MPIO drivers implemented in respective host devices. Each such MPIO driver illustratively comprises respective instances of path selection logic 314 and signature compute logic 315 configured as previously described. Additional or alternative layers and logic arrangements can be used in other embodiments.

In a manner similar to that described elsewhere herein, the MPIO layer 332 comprising path selection logic 314 and signature compute logic 315 illustratively processes a plurality of IO operations generated by a given host device. The IO operations are sent by the MPIO layer 332 to a storage array over respective paths selected using one or more algorithms implemented by path selection logic 314. The acceleration resources 310 are leveraged to compute content-based signatures for some of the IO operations, illustratively write commands each targeting one or more data blocks of a given logical storage device, as disclosed herein.

In the system 300, path selection logic 314 is configured to select different paths for sending IO operations from a given host device to a storage array. These paths as illustrated in the figure include a first path from a particular host port denoted HP1 through a particular switch fabric denoted SF1 to a particular storage array port denoted SP1, and a second path from another particular host port denoted HP2 through another particular switch fabric denoted SF2 to another particular storage array port denoted SP2.

These two particular paths are shown by way of illustrative example only, and in many practical implementations there will typically be a much larger number of paths between the one or more hosts and the one or more storage arrays, depending upon the specific system configuration and its deployed numbers of host ports, switch fabrics and storage array ports. For example, each host in the FIG. 3 embodiment can illustratively have the same number and type of paths to a shared storage array, or alternatively different ones of the hosts can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

In an example process for leveraging host acceleration resources to reduce storage system computational load in the system 300, an MPIO driver of the MPIO layer 332 via its signature compute logic 315 is configured to obtain in a corresponding host device deduplication information relating to a logical storage device of a storage array, and to determine based at least in part on the obtained deduplication information whether to compute a content-based signature for one or more data blocks of the logical storage device utilizing the acceleration resources 310 of the host device. Responsive to an affirmative result of the determining, the content-based signature is computed utilizing the acceleration resources 310 of the host device and sent by the host device to the storage array in association with a given write operation that targets the one or more data blocks of the logical storage device. Responsive to a negative result of the determining, the content-based signature is not computed utilizing the acceleration resources 310 of the host device and the given write operation is sent by the host device to the storage array without the content-based signature.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of host ports to accommodate predicted performance needs. In some cases, the number of host ports per host device is on the order of 4, 8 or 16 host ports, although other numbers of host ports could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The host ports of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example deduplication control data structure 400 utilized in leveraging host acceleration resources to reduce storage system computational load as disclosed herein is shown. The deduplication control data structure 400 illustratively corresponds to one of deduplication control data structures 122 or 322, and is maintained by a storage array, possibly at least in part under the control of its signature compute logic 121 or 321.

In this embodiment, it is assumed that the storage array illustratively stores data for a plurality of different logical storage devices, denoted Logical Storage Device 1, Logical Storage Device 2, . . . Logical Storage Device X, each of which is assumed to comprise a separate LUN or other logical storage volume of the storage array. The deduplication control data structure 400 stores, for each of the different logical storage devices, a corresponding set of deduplication information. The deduplication information for a given one of the logical storage devices illustratively comprises, for example, a deduplication rate determined by the storage array for at least a portion of the given logical storage device, although additional or alternative deduplication information can be used. The storage array can maintain such measures or other deduplication information over time for each of the logical storage devices.

In some embodiments, the deduplication information is illustratively maintained at least in part in the form of deduplication statistics at least portions of which characterize past deduplication performance relating to the storage volume.

Additional or alternative information can be stored in the deduplication control data structure 400 in other embodiments.

Accordingly, the particular deduplication control data structure arrangement shown in FIG. 4 is only an example, and numerous other types and arrangements of deduplication information can be maintained by a storage system in one or more tables or other data structures in other embodiments. Terms such as "deduplication information" and "data structure" as used herein are intended to be broadly construed.

Referring now to FIG. 5, an example write command 500 includes an indicator 501 which specifies that host acceleration resources have been leveraged for computation of a content-based signature in an illustrative embodiment. The write command 500 is a SCSI write command adapted to convey additional information including the indicator 501. The indicator 501 in this embodiment comprises a single bit in a Group Number field 502 of the write command 500, although it is to be appreciated that other types of indicators, including multi-bit indicators arranged in additional or alternative command fields, may be used. Other fields in the write command 500 include an operation code ("opcode") field, illustratively containing an opcode 2 Ah, a write protect field, a logical block address (LBA) field, a transfer length field and a control field. The write command 500 further comprises a disable page out (DPO) bit and a forced unit access (FUA) bit.

In this embodiment, the single bit of the indicator 501 takes on a first value, illustratively a logic "1" value as shown in the figure, to indicate to the storage array that the corresponding write command includes one or more content-based signatures computed using the host acceleration resources, such that the storage array need not compute the one or more content-based signatures itself. The single bit of the indicator 501 takes on a second value, illustratively a logic "0" value, to indicate to the storage array that the corresponding write command does not include one or more content-based signatures computed using the host acceleration resources, such that the storage array will need to compute the one or more content-based signatures itself.

Although the FIG. 5 example relates to a SCSI write command, similar arrangements can be used in NVMe commands. For example, an NVMe write command illustratively comprises one or more data words ("Dwords") that each include multiple Reserve bytes, any of which can be utilized to convey an indicator such as the above-described indicator 501. These include, for example, bits 63:48 of Dword 2 and Dword 3, and bit 25 of Dword 12.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for leveraging host acceleration resources to reduce storage system computational load can be performed using different system components.

For example, various aspects of functionality for leveraging host acceleration resources to reduce storage system computational load in some embodiments can be implemented at least in part using one or more servers that are external to a storage array 105 or other type of storage system. Also, processing logic can be implemented using other types of host drivers, such as, for example, SCSI drivers, NVMe drivers or more generally other host device components.

The particular arrangements described above for leveraging host acceleration resources to reduce storage system computational load are therefore presented by way of illustrative example only. Numerous alternative arrangements of these and other features can be used in leveraging host acceleration resources in other illustrative embodiments.

As indicated previously, the illustrative embodiments disclosed herein can provide a number of significant advantages relative to conventional arrangements.

For example, these embodiments provide efficient techniques for enhanced host-side processing relating to deduplication of data for write operations.

Moreover, these embodiments advantageously leverage host resources for storage array performance enhancements.

For example, some embodiments provide techniques for leveraging GPU-based accelerators, DPU-based accelerators and/or other acceleration resources of one or more host devices to efficiently compute hashes or other content-based signatures for data being written by the one or more host devices to the storage system.

Such arrangements can, for example, significantly reduce the computational load on the storage system.

As a result, IO processing performance is significantly improved, and the storage system can more easily meet performance goals.

Various aspects of functionality associated with leveraging host acceleration resources as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a CPU, a GPU, a DPU, a microprocessor, a microcontroller, an application-specific integrated circuit (ASIC), a field-programmable gate array (FPGA), a System-on-Chip (SOC) and/or other types of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and signature compute logic 115 may be implemented at least in part in software, as indicated previously herein. Storage-side signature compute logic 121 can similarly be implemented at least in part in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, storage controllers, processors, memories, accelerators, IO queues, MPIO drivers, initiators, targets, path selection logic, signature compute logic, data structures, and additional or alternative components. Also, the particular configurations of system and device elements and associated processing operations illustratively shown in the drawings can be varied in other embodiments. For example, a wide variety of different host device and storage system configurations and associated arrangements for leveraging host acceleration resources to reduce storage system computational load can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain in a host device deduplication information relating to a logical storage device of a storage system, wherein the host device comprises acceleration resources and is configured to communicate with the storage system over at least one network, wherein obtaining the deduplication information in the host device comprises the host device requesting the deduplication information from the storage system and receiving the deduplication information from the storage system in response to the request, the deduplication information being stored by the storage system in a storage-side data structure in association with an identifier of the logical storage device and comprising one or more statistical measures characterizing results of one or more deduplication operations previously performed in the storage system for at least a subset of a plurality of data blocks of the logical storage device; and to determine based at least in part on the obtained deduplication information whether to compute a content-based signature for one or more of the plurality of data blocks of the logical storage device utilizing the acceleration resources of the host device, wherein utilization of the acceleration resources of the host device is controlled by the host device based at least in part on the obtained deduplication information comprising the one or more statistical measures characterizing the results of the one or more deduplication operations previously performed in the storage system;

wherein responsive to an affirmative result of the determining, the content-based signature is computed utilizing the acceleration resources of the host device and sent by the host device to the storage system in association with a given write operation that targets the one or more data blocks of the logical storage device; and wherein responsive to a negative result of the determining, the content-based signature is not computed utilizing the acceleration resources of the host device and the given write operation is sent by the host device to the storage system without the content-based signature.

2. The apparatus of claim 1 wherein the at least one processing device comprises at least the host device.

3. The apparatus of claim 1 wherein the acceleration resources comprise at least one of one or more graphics processing units (GPUs) and one or more data processing units (DPUs) implemented within the host device.

4. The apparatus of claim 1 wherein the content-based signature is computed for the one or more data blocks of the logical storage device by applying a secure hashing algorithm to the one or more data blocks.

5. The apparatus of claim 1 wherein the at least one processing device is further configured:

to send a designated command from the host device to the storage system to obtain in response thereto from the storage system an indication as to whether or not the storage system supports leveraging of the acceleration resources of the host device to compute the content-based signature; and to initiate the determining based at least in part on the obtained indication.

6. The apparatus of claim 1 wherein the at least one processing device is further configured:

to send a designated command from the host device to the storage system to obtain in response thereto from the storage system an indication as to a particular deduplication process utilized by the storage system for the logical storage device; and to initiate the determining based at least in part on the obtained indication.

7. The apparatus of claim 1 wherein the deduplication information comprises at least a deduplication rate for at least a portion of the logical storage device.

8. The apparatus of claim 7 wherein determining based at least in part on the obtained deduplication information whether to compute the content-based signature for the one or more data blocks of the logical storage device utilizing the acceleration resources of the host device comprises:

comparing the deduplication rate to a threshold;

responsive to the deduplication rate being at or above the threshold, reaching the affirmative result of the determining; and responsive to the deduplication rate being below the threshold, reaching the negative result of the determining.

9. The apparatus of claim 1 wherein obtaining in the host device the deduplication information relating to the logical storage device comprises sending a designated command from the host device to the storage system to obtain the deduplication information from the storage system in response to the designated command.

10. The apparatus of claim 1 wherein the content-based signature is sent from the host device to the storage system in a header of the given write operation.

11. The apparatus of claim 10 wherein a payload of the given write operation comprises the one or more data blocks from which the content-based signature in the header was computed utilizing the acceleration resources of the host device.

12. The apparatus of claim 1 wherein a header of the given write operation includes an indication as to whether or not acceleration resources of the host device have been utilized to compute the content-based signature.

13. The apparatus of claim 1 wherein a header of the given write operation includes a plurality of content-based signatures computed utilizing the acceleration resources of the host device for respective different sets of one or more data blocks of the logical storage device that are targeted by the given write operation.

14. The apparatus of claim 1 wherein the storage system is configured:

to determine whether or not the content-based signature received from the host device in association with the given write operation is recognized by the storage system as corresponding to an existing content-based signature already present in the storage system; and responsive to the content-based signature not being recognized by the storage system, to obtain the one or more data blocks from the given write operation and to store the one or more data blocks in association with the content-based signature.

15. A computer program product comprising a non-transitory processor-readable storage medium having stored therein program code of one or more software programs, wherein the program code, when executed by at least one processing device comprising a processor coupled to a memory, causes the at least one processing device:

to obtain in a host device deduplication information relating to a logical storage device of a storage system, wherein the host device comprises acceleration resources and is configured to communicate with the storage system over at least one network, wherein obtaining the deduplication information in the host device comprises the host device requesting the deduplication information from the storage system and receiving the deduplication information from the storage system in response to the request, the deduplication information being stored by the storage system in a storage-side data structure in association with an identifier of the logical storage device and comprising one or more statistical measures characterizing results of one or more deduplication operations previously performed in the storage system for at least a subset of a plurality of data blocks of the logical storage device; and to determine based at least in part on the obtained deduplication information whether to compute a content-based signature for one or more of the plurality of data blocks of the logical storage device utilizing the acceleration resources of the host device, wherein utilization of the acceleration resources of the host device is controlled by the host device based at least in part on the obtained deduplication information comprising the one or more statistical measures characterizing the results of the one or more deduplication operations previously performed in the storage system;

wherein responsive to an affirmative result of the determining, the content-based signature is computed utilizing the acceleration resources of the host device and sent by the host device to the storage system in association with a given write operation that targets the one or more data blocks of the logical storage device; and wherein responsive to a negative result of the determining, the content-based signature is not computed utilizing the acceleration resources of the host device and the given write operation is sent by the host device to the storage system without the content-based signature.

16. The computer program product of claim 15 wherein the deduplication information comprises at least a deduplication rate for at least a portion of the logical storage device, and further wherein determining based at least in part on the obtained deduplication information whether to compute the content-based signature for the one or more data blocks of the logical storage device utilizing the acceleration resources of the host device comprises:

comparing the deduplication rate to a threshold;

responsive to the deduplication rate being at or above the threshold, reaching the affirmative result of the determining; and responsive to the deduplication rate being below the threshold, reaching the negative result of the determining.

17. The computer program product of claim 15 wherein the content-based signature is sent from the host device to the storage system in a header of the given write operation.

18. A method comprising:

obtaining in a host device deduplication information relating to a logical storage device of a storage system, wherein the host device comprises acceleration resources and is configured to communicate with the storage system over at least one network, wherein obtaining the deduplication information in the host device comprises the host device requesting the deduplication information from the storage system and receiving the deduplication information from the storage system in response to the request, the deduplication information being stored by the storage system in a storage-side data structure in association with an identifier of the logical storage device and comprising one or more statistical measures characterizing results of one or more deduplication operations previously performed in the storage system for at least a subset of a plurality of data blocks of the logical storage device; and determining based at least in part on the obtained deduplication information whether to compute a content-based signature for one or more of the plurality of data blocks of the logical storage device utilizing the acceleration resources of the host device, wherein utilization of the acceleration resources of the host device is controlled by the host device based at least in part on the obtained deduplication information comprising the one or more statistical measures characterizing the results of the one or more deduplication operations previously performed in the storage system;

wherein responsive to an affirmative result of the determining, the content-based signature is computed utilizing the acceleration resources of the host device and sent by the host device to the storage system in association with a given write operation that targets the one or more data blocks of the logical storage device; and wherein responsive to a negative result of the determining, the content-based signature is not computed utilizing the acceleration resources of the host device and the given write operation is sent by the host device to the storage system without the content-based signature.

19. The method of claim 18 wherein the deduplication information comprises at least a deduplication rate for at least a portion of the logical storage device, and further wherein determining based at least in part on the obtained deduplication information whether to compute the content-based signature for the one or more data blocks of the logical storage device utilizing the acceleration resources of the host device comprises:

comparing the deduplication rate to a threshold;

responsive to the deduplication rate being at or above the threshold, reaching the affirmative result of the determining; and responsive to the deduplication rate being below the threshold, reaching the negative result of the determining.

20. The method of claim 18 wherein the content-based signature is sent from the host device to the storage system in a header of the given write operation.

* * * * *